US010012214B2

(12) United States Patent
Kjær et al.

(10) Patent No.: US 10,012,214 B2
(45) Date of Patent: Jul. 3, 2018

(54) WIND FARM AND A METHOD OF OPERATING A WIND FARM

(75) Inventors: Martin Ansbjerg Kjær, Harlev J (DK); Ali Zaib, Aalborg (DK); Erik Carl Lehnskov Miranda, Randers SV (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 14/123,257

(22) PCT Filed: May 29, 2012

(86) PCT No.: PCT/DK2012/050183
§ 371 (c)(1),
(2), (4) Date: Dec. 17, 2013

(87) PCT Pub. No.: WO2012/163359
PCT Pub. Date: Dec. 6, 2012

(65) Prior Publication Data
US 2014/0110941 A1    Apr. 24, 2014

Related U.S. Application Data (60) Provisional application No. 61/491,344, filed on May 31, 2011.

(30) Foreign Application Priority Data

Jun. 3, 2011    (DK) .................................. 2011 70282

(51) Int. Cl.
*F03D 9/00* (2016.01)
*H02P 9/04* (2006.01)
(Continued)

(52) U.S. Cl.
CPC ........... *F03D 7/048* (2013.01); *F03D 7/0264* (2013.01); *F05B 2270/101* (2013.01);
(Continued)

(58) Field of Classification Search
CPC ... Y02E 10/723; Y02E 10/763; Y02E 10/722; Y02E 10/563; Y02E 10/50; Y02E 10/721;
(Continued)

(56) References Cited

U.S. PATENT DOCUMENTS 7,025,567 B2 * 4/2006 Wobben ........................... 416/1
2007/0124025 A1 * 5/2007 Schram ................ F03D 7/0224
700/287
(Continued)

FOREIGN PATENT DOCUMENTS

DE    19844258 A1    3/2000
DE    102006021982 A1    11/2007
(Continued)

OTHER PUBLICATIONS

DK Search & Examination Report, PA 2011 70282, dated Jan. 10, 2012.
(Continued)

*Primary Examiner* — Tulsidas C Patel
*Assistant Examiner* — Thomas Quigley
(74) *Attorney, Agent, or Firm* — Patterson + Sheridan, LLP (57) ABSTRACT

According to an aspect of the invention, a wind farm is provided. The wind farm includes a plurality of wind turbines and a wind farm controller. The controller is configured to detect a high wind condition from at least one wind turbine in the wind farm, reduce a parameter setpoint of at least one other wind turbine, and increase a cut-out wind speed threshold of the at least one other wind turbine.

20 Claims, 4 Drawing Sheets

(51) Int. Cl.
  *F03D 7/04* (2006.01)
  *F03D 7/02* (2006.01)
(52) U.S. Cl.
  CPC . *F05B 2270/107* (2013.01); *F05B 2270/1033* (2013.01); *F05B 2270/3201* (2013.01); *Y02E 10/723* (2013.01)
(58) Field of Classification Search
  CPC .... Y02E 10/725; F03D 11/0091; F03D 11/00; F03D 11/0025; F03D 7/045; F03D 7/028; F03D 7/0284; F03D 7/047; F03D 7/0204; F03D 7/0224; F03D 7/0208; F03D 7/026; F03D 7/0264; F03D 7/0268; F03D 7/0272
  USPC ...................................... 290/44, 55; 700/287
  See application file for complete search history.

(56) References Cited

U.S. PATENT DOCUMENTS

2009/0102195 A1* 4/2009 Altemark .............. F03D 7/0268
                                                  290/44
2011/0295438 A1* 12/2011 Rogers .................. F03D 7/0204
                                                  700/287
2012/0029712 A1* 2/2012 Parikh ..................... G01W 1/10
                                                  700/287
2012/0169052 A1* 7/2012 Leipold-Buettner . F03D 7/0208
                                                  290/44

FOREIGN PATENT DOCUMENTS

| | | |
|---|---|---|
| EP | 2090775 A2 | 8/2009 |
| EP | 2096301 A2 | 9/2009 |
| WO | 2008/131776 A2 | 11/2008 |

OTHER PUBLICATIONS

International Search Report and Written Opinion, PCT/DK2012/050183, dated Sep. 17, 2012.

* cited by examiner

WIND FARM AND A METHOD OF OPERATING A WIND FARM

FIELD OF THE INVENTION

The present invention relates generally to a wind farm, and in particular, to a method for operating the wind farm during high wind condition.

BACKGROUND OF THE INVENTION

Harsh weather conditions such as high wind speed have high impact on wind turbines in a wind farm, causing large unbalanced loads on turbine components due to the excessive aero-dynamic power of the wind acting on the wind turbine rotor. Typically, these harsh or extreme conditions are rare but if no mitigation actions are taken to alleviate these loads during such conditions, the turbine components may be damaged or the overall lifetime of the components may be reduced by a significant amount.

It is known to cut-off the wind turbine from the grid or shut down the wind turbine when the wind speed exceeds a predefined wind speed threshold in order not to subject the turbine components to the extreme loads. This shutting down of the wind turbine during high wind is a safety procedure to protect the turbine. When the turbine is shut down due to high wind, it has to be re-started when normal wind condition is detected. The start-up process of the turbine takes a significant amount of time and also consumes power from the grid. Therefore, a substantial amount of power production is lost every time the turbine is shut down due to high wind and re-started when the wind condition returns to normal. Specifically, the period between the time the wind condition returns to normal and the time the turbine is ready to produce power after re-starting can be used for power production. This is especially true when the high wind condition only lasts for a short time, and shutting down the turbine during this transient wind condition seems impractical.

It is desirable to provide a method to allow some of the wind turbines in a wind farm to remain connected to the grid even during high wind condition, as so to reduce loss of power production.

SUMMARY OF THE INVENTION

According to a first aspect of the invention, a wind farm is provided. The wind farm includes a plurality of wind turbines and a wind farm controller. The controller is configured to detect a high wind condition from at least one wind turbine in the wind farm, reduce a parameter setpoint of at least one other wind turbine, and increase a cut-out wind speed threshold of the at least one other wind turbine.

According to a second aspect of the invention, a method of operating a wind farm comprising a plurality of wind turbines and a wind farm controller is provided. The method includes detecting a high wind condition from at least one wind turbine in the wind farm, reducing a parameter setpoint of at least one other wind turbine, and increasing a cut-out wind speed threshold of the at least one other wind turbine.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

A wind farm includes a plurality of wind turbines and a wind farm controller. The wind farm controller controls the operation of the wind turbines in the wind farm, and may also control the operations of other components such as STATCOMs, capacitor banks, etc, present in the wind farm. The controller is usually in data communication with the wind turbines and controls the wind turbines by sending control signals. The controller also receives data such as grid information, weather information and status of the wind turbines. This information may be received by the controller from the wind turbines, grid sensors, metrological stations or operators for processing, and the processed information may then be used to determine the operation of the wind turbines.

According to the first aspect of the invention, the controller is configured to detect a high wind condition from at least one wind turbine in the wind farm, reduce a parameter setpoint of at least one other wind turbine, and increase a cut-out wind speed threshold of the at least one other wind turbine. When a wind turbine encountered a high wind condition, it may send a signal to inform the wind farm controller. Therefore, the controller may detect the high wind condition by detecting whether it has received such a signal from any of the wind turbines. Alternatively, the controller may query each wind turbine in the wind farm to determine whether any of the wind turbines has encountered a high wind condition.

The controller is configured to reduce the parameter setpoint of another wind turbine if it has detected that one of the wind turbines in the wind farm has encountered a high wind condition. The wind turbine having its parameter setpoint been reduced by the controller is different from the wind turbine which encountered and detected the high wind condition, although it is also possible that the wind turbine which encountered the high wind condition may also have its parameter setpoint reduced as well. The controller can reduce the parameter setpoint of the other wind turbine by sending a control signal containing a new parameter setpoint to the other wind turbine.

A parameter setpoint refers to a predefined parameter value which a wind turbine aims to achieve. For example, the parameter may refer to the power output from the generator of the wind turbine, and the setpoint may be set to 650 kW. Hence the generator needs to be controlled such that it generates an output power of approximately 650 kW. It should be noted that this is an example only, and the parameter setpoint shall not be restricted to the setpoint for generator output power.

Other than having its parameter setpoint reduced, the controller is also configured to increase the cut-out wind speed threshold of this other wind turbine. The cut-out wind speed threshold refers to the maximum wind speed that the wind turbine can operate in normal operation such as at rated power level without substantial risk of damaging its turbine components due to extreme loads. When the wind speed detected by the wind turbine exceeds this wind speed threshold, it shuts down as a safety measure in order to protect its components. Since the parameter setpoint of the wind turbine has been reduced, the turbine loads may be reduced and the wind turbine may then be able to continue operating at the cut-out wind speed threshold or higher without experiencing extreme loads. By increasing its cut-out wind speed threshold, the wind turbine is able to continue operating at a higher wind speed before shutting down.

All the wind turbines in the wind farm may have the same cut-out wind speed threshold. It is also possible that the wind turbines have different cut-out wind speed threshold depending on locations. For example, turbines in a region nearer to where the wind strikes first may have a lower cut-out wind speed threshold and turbines in a region further away from where the wind strikes first may have a higher cut-out wind speed threshold.

According to the invention, the likelihood that all turbines are shut down if the wind speed exceeded the cut-out wind speed threshold of the wind turbines is reduced. This is in contrast with prior art solutions where all the turbines in the wind farm will shut down when the wind speed detected by the wind turbines exceeded their respective cut-out wind speed threshold. Accordingly, the power production loss of the wind farm during high wind condition is reduced.

According to an embodiment, the controller is configured to repeat the steps of detecting a high wind condition from at least one wind turbine in the wind farm, reducing the parameter setpoint of at least one other wind turbine, and increasing the cut-out wind speed threshold of the at least one other wind turbine, until the cut-out wind speed threshold of the at least one other wind turbine has reached a maximum cut-out wind speed threshold. In other words, the method recited in the first aspect of the invention is repeated and the cut-out wind speed threshold of the other wind turbine is increased. This process is repeated until the cut-out wind speed of the other turbine reached the maximum threshold. It is also possible the process is repeated until there is no further high wind conditions being detected by any of the turbines.

When the parameter setpoint of the other one or more wind turbines has been reduced and the cut-out wind speed threshold has been increase, the wind turbine is more able to withstand the current high wind condition (because the loads on the turbine components kept within acceptable limits). However when the high wind condition is still detected by at least one wind turbine, it means that the loads on the turbine components of the wind turbine is still too high. This could be due to the reduction of parameter setpoint is insufficient to reduce the loads on the turbine components. Another possibility is that the high wind condition has become more severe (e.g. further increase in wind speed).

Therefore when the high wind condition is detected by the controller from a wind turbine, the parameter setpoint of one or more of the other wind turbines is reduced, and the cut-out wind speed threshold is increased according to the embodiment. This ensures that the wind farm is adaptive to the high wind condition and continues to ensure that the loads on the turbines in the wind farm are kept within acceptable limits. However when the cut-out wind speed threshold has increased to its maximum allowable value, the iterative process stops. The maximum cut-out wind speed threshold is the maximum wind speed a wind turbine is still able to operate, and above this wind speed, the loads on the turbine components will not be able to be kept within acceptable limits even if the turbine is operating at very low power level. Usually the turbine is shut down to prevent damages.

It should be noted that in this embodiment, the wind turbine from which the high wind condition is detected may be the same or different wind turbine from an earlier iterative process.

According to an embodiment, the controller is configured to restore the at least one other wind turbine to its original parameter setpoint and its original cut-out wind speed threshold when the controller detects a normal wind condition. When there is no high wind condition, the turbine components are not in danger of overloading due to high wind. Hence the parameter setpoint and the cut-out wind speed threshold can revert to their original values in order to maximize power production.

The controller may detect the normal wind condition based on information received from one of the wind turbines in the wind farm. Specifically, the controller may make use of existing wind sensing devices, for example wind anemometer, on the wind turbines. It is also possible for the controller to detect wind condition using dedicated wind anemometer at the wind farm controller or at other locations in the wind farm. Alternatively or additionally, the controller may make use of metrological data to determine whether there is normal wind condition.

According to an embodiment, the controller is configured to start up any wind turbines in the wind farm which have been shut down due to high wind condition. As mentioned earlier, a wind turbine normally shuts down when the wind speed detected is above its cut-out wind speed threshold. Therefore, there might be wind turbines in the wind farm which may have shut down due to high wind condition. When the controller has detected a normal wind condition, such wind turbines are re-started in order to maximize power production of the wind farm.

According to an embodiment, the controller is configured to detect wind direction, and assign cut-out wind speed threshold for each of the plurality of wind turbines in the wind farm based on the wind direction and the location of each of the plurality of wind turbines in the wind farm. The wind direction may be detected by any wind vane installed on any of the wind turbines or using a dedicated wind direction sensor. The wind turbine located in the upstream wind direction may be assigned a lower cut-out wind speed threshold, and wind turbine located in the downstream wind direction may be assigned a higher cut-out wind speed threshold. Thus not all the cut-out wind speed thresholds of all the wind turbines need to be adjusted during a high wind condition.

According to an embodiment, detecting the high wind condition from the at least one wind turbine comprises detecting whether the wind turbine has been shut down due to high wind condition. Detecting whether any wind turbine has been shut down due to high wind condition is a simple way of detecting high wind condition by the controller. As mentioned earlier, a wind turbine normally shuts down when wind speed is above the wind speed threshold or when the loads experienced by the turbine components exceed the load threshold. When the wind turbine shuts down, it sends a signal to the controller indicating its shut down status, and also other related information. The controller detects this shut down signal from the wind turbine to determine if a high wind condition has been detected according to the embodiment.

According to an embodiment, the high wind condition for shutting down the at least one wind turbine comprises at least one of wind speed detected by the wind turbine exceeds the cut-out wind speed threshold, the blade load moments of the wind turbine exceeds a blade load moment threshold, the drive train loads of the wind turbine exceeds a drive train load threshold, and the tower acceleration of the wind turbine exceeds a acceleration threshold. High wind condition may cause the wind speed, blade load moments, drive train loads and tower acceleration to exceed a certain threshold. By monitoring any one of these parameters, the high wind condition may be detected and the wind turbine may be shut down accordingly.

According to an embodiment, detecting the high wind condition from the at least one wind turbine comprises detecting at least one of wind speed detected by the wind turbine exceeds the cut-out wind speed threshold, the blade load moments of the wind turbine exceeds a blade load moment threshold, the drive train loads of the wind turbine exceeds a drive train load threshold, and the tower acceleration of the wind turbine exceeds a acceleration threshold. In this embodiment, instead of detecting high wind condition by detecting whether any wind turbine has been shut down, the controller can detect whether the wind speed, blade load moments, drive train loads and tower acceleration in any wind turbine shutting has exceeded a certain threshold. It should be noted that other ways of detecting high wind condition by the turbine is possible. In other embodiments, a high wind condition may be detected by the wind turbine by detecting wind direction, generator power, DC link voltage, etc.

According to an embodiment, reducing the parameter setpoint comprises reducing a power setpoint so that the power production of the at least one other wind turbine is reduced. A power setpoint is used to control the generator power output or the turbine power output of the wind turbine. When this power setpoint of the wind turbine is reduced, the generator or turbine power output will be reduced accordingly. This allows the rotational speed of the rotor to also be reduced. In other words, the wind turbine is de-rated. When the turbine is operating at a lower power production level and hence at a lower rotor rotation speed, the loads on the turbine components are also lower.

According to an embodiment, reducing the parameter setpoint comprises reducing both the power setpoint and a rotor speed setpoint so that the power production and the rotational speed of the rotor of the at least one other wind turbine are reduced. Accordingly, the loads on the turbine components are also reduced.

It should be noted that a person skilled in the art would readily recognize that any features described above could also be used in conjunction to the method of operating the wind farm according to the second aspect of the invention.

Figure 1:
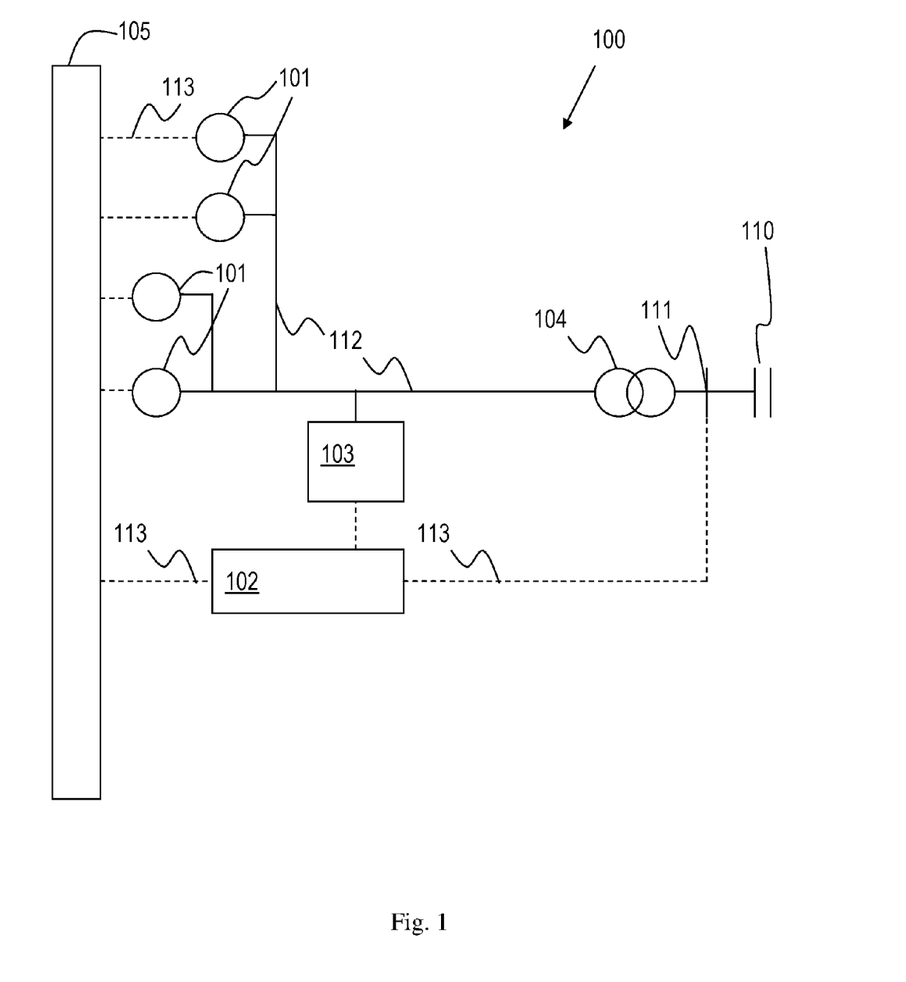
FIG. 1 illustrates a general layout of a wind farm comprising a plurality of the wind turbines and a controller.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims FIG. 1 illustrates a general layout of a wind farm 100. The wind farm 100 includes a plurality of wind turbines 101 (such as the wind turbine shown in FIG. 2), a wind farm controller 102, a wind farm transformer 104 and a wind farm network 105. The wind farm 100 is connected to a utility system or grid 110 via power lines 112 and through the wind farm transformer 104. The interface point between the wind farm 100 and the utility system 110 is called the point of common coupling (PCC) 111. Power produced by the wind turbines 101 are distributed over the power lines 112 and provided to grid 110 via the PCC 111. The wind farm transformer 104 steps up or down the voltage from the wind farm 100 into a voltage suitable for transmission in the grid 110.

The wind farm 100 may further include compensation devices 103. The compensation device is a reactive power generation device used to compensate reactive power of the wind farm 100. Examples of the compensation device 103 include but not limited to a thyristor switched capacitor bank and a static VAR compensator (SVC). The reactive power from the compensation device 103 is also delivered to the grid 110 over power lines 112.

The wind farm controller 102 generally fulfils a plurality of control functions. For example, the wind farm controller 102 may collect different types of data which characterizes the current state of the wind turbines 101 or components thereof, and in response thereto control the operation of the wind turbines 101. The wind turbines 101 communicate with the controller 102 through the wind farm network 105 using control lines 113 as shown as dotted lines in FIG. 1. The signals communicated between the controller 102 and the wind turbines 101 may include power output signal, turbine status, power reference, turbine command, power setpoints, etc. The controller 102 is also connected to the PCC 111 via control line 113. This allows the controller 102 to detect power parameters such as voltage and current levels at the PCC 111.

It should be noted that the layout of the wind farm 100 shown in FIG. 1 is only an example, and the invention is not restricted to the exact layout of the wind farm shown in FIG. 1. For example, although 4 wind turbines 101 are shown in the wind farm 100, it is possible that the wind farm includes more or less than 4 wind turbines 101. It is also possible that the wind farm only has one wind turbine 101. Similarly, the wind farm 101 may include more than 1 compensation devices in other examples.

Figure 2:
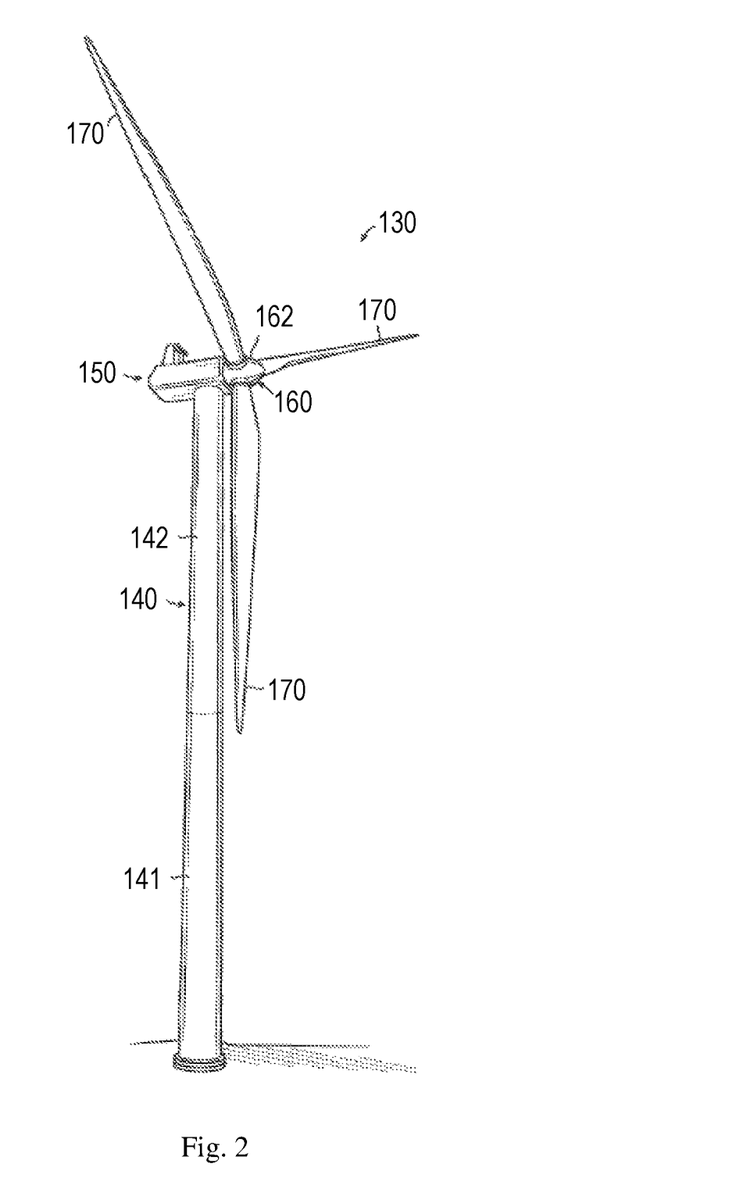
FIG. 2 illustrates a general structure of a wind turbine.

FIG. 2 illustrates an exemplary wind turbine 130 according to an embodiment. As illustrated in FIG. 2, the wind turbine 130 includes a tower 140, a nacelle 150, and a rotor 160. In one embodiment, the wind turbine 130 may be an onshore wind turbine. However, embodiments of the invention are not limited only to onshore wind turbines. In alternative embodiments, the wind turbine 130 may be an offshore wind turbine located over a water body such as, for example, a lake, an ocean, or the like. The tower 140 of such an offshore wind turbine is installed on either the sea floor or on platforms stabilized on or above the sea level.

The tower 140 of wind turbine 130 may be configured to raise the nacelle 150 and the rotor 160 to a height where strong, less turbulent, and generally unobstructed flow of air may be received by the rotor 160. The height of the tower 140 may be any reasonable height, and should consider the length of wind turbine blades extending from the rotor 160. The tower 140 may be made from any type of material, for example, steel, concrete, or the like. In some embodiments the tower 140 may be made from a monolithic material. However, in alternative embodiments, the tower 140 may include a plurality of sections, for example, two or more tubular steel sections 141 and 142, as illustrated in FIG. 2. In some embodiments of the invention, the tower 140 may be a lattice tower. Accordingly, the tower 140 may include welded steel profiles.

The rotor 160 may include a rotor hub (hereinafter referred to simply as the "hub") 162 and at least one blade 170 (three such blades 170 are shown in FIG. 2). The rotor hub 162 may be configured to couple the at least one blade 170 to a shaft (not shown). In one embodiment, the blades 170 may have an aerodynamic profile such that, at predefined wind speeds, the blades 170 experience lift, thereby causing the blades to radially rotate around the hub. The hub 170 further comprises mechanisms (not shown) for adjusting the pitch of the blade 170 to increase or reduce the amount of wind energy captured by the blade 170. Pitching adjusts the angle at which the wind strikes the blade 170. It is also possible that the pitch of the blades 170 cannot be adjusted. In this case, the aerodynamic profile of the blades 170 is designed in a manner that the lift experienced by the blades are lost when the wind speed exceeded a certain threshold, causing the turbine to stall.

The hub 162 typically rotates about a substantially horizontal axis along a drive shaft (not shown) extending from the hub 162 to the nacelle 150. The drive shaft is usually coupled to one or more components in the nacelle 150, which are configured to convert and the rotational energy of the shaft into electrical energy.

Although the wind turbine 130 shown in FIG. 2 has three blades 170, it should be noted that a wind turbine may have different number of blades. It is common to find wind turbines having two to four blades. The wind turbine 130 shown in FIG. 2 is a Horizontal Axis Wind Turbine (HAWT) as the rotor 160 rotates about a horizontal axis. It should be noted that the rotor 160 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 170 in the rotor 160.

Figure 3:
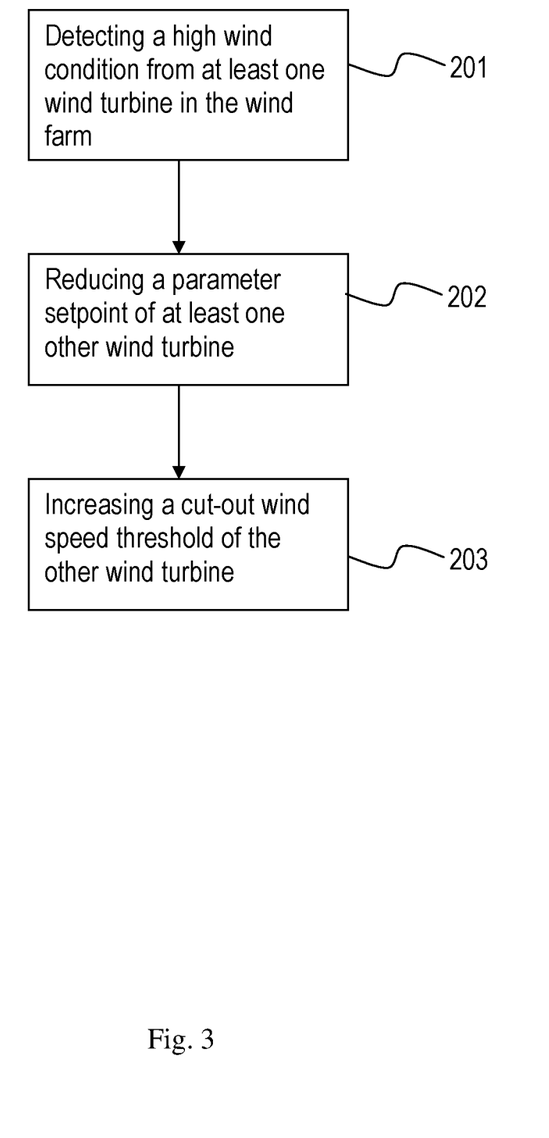
FIG. 3 illustrates a flow-chart of a method for operating the wind farm according to an embodiment.

FIG. 3 illustrates a flow-chart of a method for operating the wind farm according to an embodiment. The steps illustrated in this flow-chart may be implemented by the controller 102 of the wind farm 100. Step 201 includes detecting a high wind condition from at least one turbine in the wind farm. In an embodiment, the high wind condition may be detected from one of the wind turbines 101 in the wind farm 100 as shown in FIG. 1. It is possible that the high wind condition is detected from more than one wind turbines 101. Step 202 includes reducing a parameter setpoint of at least one other wind turbine. In an embodiment, the parameter setpoint of another wind turbine 101 (different from the wind turbine mentioned in Step 201) is reduced. The parameter setpoint may be a power setpoint. Reducing the power setpoint results in a reduction of the power output, and hence the rotor rotational speed, of this other wind turbine 101. It is possible that the parameter setpoint of more than one turbines 101 is reduced. In this case, the turbines with their parameter setpoints reduced may include both the other turbine 101 mentioned in Step 202 and the turbine 101 mentioned in Step 201. In another embodiment, both the power setpoint and a rotor speed setpoint of the other wind turbine 101 are reduced.

Step 203 includes increasing a cut-out wind speed threshold of the other turbine. For the turbine where its parameter setpoint is reduced, its cut-out wind speed threshold is also increased. If the parameter setpoint of more than one turbines is reduced in Step 202, the cut-out wind speed threshold of these turbines are also increased. To more clearly illustrate the method according to the embodiment, different examples of operating the wind farm based on the method according to the embodiment is illustrated with reference to FIG. 4.

Figure 4:
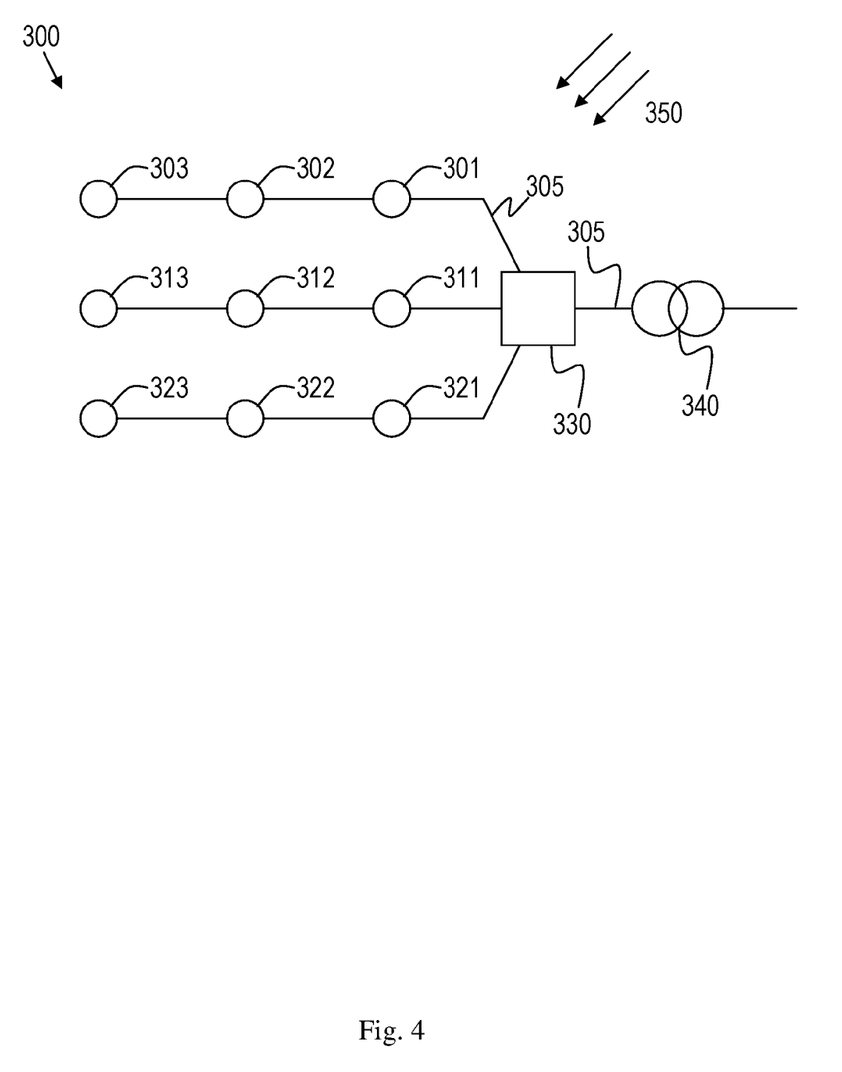
FIG. 4 illustrates a layout of wind turbines in a wind farm.

FIG. 4 illustrates a layout of wind turbines in a wind farm 300. The wind farm 300 includes a plurality of wind turbines 301, 302, 303, 311, 312, 313, 321, 322, 323, a wind farm controller 330 and a wind farm transformer 340. All the wind turbines are connected, either directly or indirectly, to the controller 330. For simplicity sake, the lines 305 in FIG. 4 represent both power and data communication paths among the various components in the wind farm 300. The arrows 350 represent the wind direction.

A first example (example 1) of operating the wind farm during high wind condition will now be described with reference to FIG. 4. The cut-out wind speed threshold for all the wind turbines 301, 302, 303, 311, 312, 313, 321, 322, 323 are set at 25 m/s. At the onset of a high wind condition with wind speed above 25 m/s, wind turbine 301 detects that wind speed is above its threshold of 25 m/s and shuts down accordingly as a safety measure. The wind turbine 301 also informs the controller 330 that it has shut down due to high wind. When the controller 330 has detected that the wind turbine 301 has shut down due to high wind condition, it sends a de-rate signal to all the other wind turbines 302, 303, 311, 312, 313, 321, 322, 323 to reduce its power setpoint to 80% of its rated power production. Accordingly, the other wind turbines 302, 303, 311, 312, 313, 321, 322, 323 are controlled to reduce its power production to 80% of their original power production. The rotational speed of the rotor of the wind turbines 302, 303, 311, 312, 313, 321, 322, 323 is also reduced correspondingly. In addition, the controller also send a signal to request the other turbines 302, 303, 311, 312, 313, 321, 322, 323 to increase their cut-out wind speed threshold to 28 m/s.

The controller 330 continues to monitor the status of the wind turbines 302, 303, 311, 312, 313, 321, 322, 323. When the wind speed further increases above 28 m/s, wind turbine 302 shuts down and informs the controller 330 accordingly. The controller 330, upon detecting that the wind turbine 302 has shut down due to high wind, sends a de-rate signal to the other wind turbines 303, 311, 312, 313, 321, 322, 323 to further reduce their power setpoint to 60% of its original value. This results in the power production of the other wind turbines 303, 311, 312, 313, 321, 322, 323 to be reduced to 60% of its rated power production. Additionally, the controller 330 also requests the cut-out wind speed threshold to be further increased to 30 m/s.

When the wind speed further increases above 30 m/s, wind turbines 311, 312 shut down and inform the controller 330 accordingly. The controller 330, upon detecting that the wind turbines 311, 312 have shut down due to high wind, sends a de-rate signal to the other wind turbines 303, 313, 321, 322, 323 to further reduce their power setpoint to 40% of its original value. This results in the power production of the other wind turbines 303, 313, 321, 322, 323 to be reduced to 40% of its rated power production. The controller 330 also requests the cut-out wind speed threshold to be further increased to 33 m/s.

When the wind speed further increases above 33 m/s, wind turbines 303, 313 shut down and inform the controller 330 accordingly. The controller 330, upon detecting that the wind turbines 303, 313 have shut down due to high wind, sends a de-rate signal to the other wind turbines 321, 322, 323 to further reduce their power setpoint to 20% of its original value. This results in the power production of the other wind turbines 321, 322, 323 to be reduced to 20% of its rated power production. The controller 330 also requests the cut-out wind speed threshold to be further increased to 35 m/s, which is the maximum cut-out wind speed threshold.

When the wind speed further increases above 35 m/s, all remaining wind turbine 321, 322, 323 are shut down. This is because 35 m/s is the maximum cut-out wind speed threshold and above this threshold, the loads on the turbine components will be too extreme even if the turbines are operating at a low power production level.

At any time when normal wind condition is detected, the power setpoint of the remaining operating wind turbines is reset to its original power setpoint. For example if normal wind condition is detected when wind turbines 303, 313, 321, 322, 323 are operating at 40% of its rated power production (i.e. wind speed has not reached 33 m/s yet), the power setpoint of these turbines 303, 313, 321, 322, 323 are reset back to 100% rated power production and the power production is restored back to 100% accordingly by increasing the rotor speed back to its original rotational speed. The cut-out wind speed threshold of the turbines 303, 313, 321, 322, 323 is also reset back to its original threshold value, i.e. 25 m/s.

In an embodiment, the controller 330, upon detecting the normal wind condition, causes the turbines which have been shut down to be restarted. For example, the turbines 301, 302, 311, 312 which have been shut down when the wind speed exceeded 30 m/s are re-started when normal wind condition has been detected.

The normal wind condition includes the condition when the wind speed is below 25 m/s. The normal wind condition may be detected by any of the wind turbines in the wind farm 300. Alternatively or additionally, the normal wind condition may be detected by the controller 330 itself (e.g. wind anemometer mounted on or near the controller 330) or based on metrological data from metrological station.

It can be seen from this example that during high wind condition with wind speed between 25 m/s to 35 m/s, there are still some turbines operating and not all the turbines in the wind farm have shut down. Therefore the method according to the embodiment reduces overall loss of power production during high wind condition.

A second example (example 2) of operating the wind farm during high wind condition will now be described with reference to FIG. 4. The cut-out wind speed threshold for all the wind turbines 301, 302, 303, 311, 312, 313, 321, 322, 323 are set at 25 m/s. At the onset of a high wind condition, wind turbine 301 detects that its blade load moments exceeded its blade load moment threshold and informs the controller 330 of the high wind condition. When the controller 330 has been informed of the high wind condition, it sends a de-rate signal to all the wind turbines 301, 302, 303, 311, 312, 313, 321, 322, 323 to reduce its power setpoint to 80% of its rated power production. Accordingly, the wind turbines 301, 302, 303, 311, 312, 313, 321, 322, 323 are controlled to reduce its power production to 80% of their original power production. In addition, the controller also send a signal to request the turbines 301, 302, 303, 311, 312, 313, 321, 322, 323 to increase their cut-out wind speed threshold to 28 m/s.

The controller 330 continues to monitor the status of the wind turbines. When the wind speed further increases above 28 m/s, wind turbines 301, 302 have blade load moments exceeding their blade load moment threshold and inform the controller 330 accordingly. The controller 330 again sends a de-rate signal to all the wind turbines 301, 302, 303, 311, 312, 313, 321, 322, 323 to further reduce their power setpoint to 60% of its original value. The controller 330 also requests the cut-out wind speed threshold of the turbines 301, 302, 303, 311, 312, 313, 321, 322, 323 to be further increased to 30 m/s.

This process is repeated until the cut-out wind speed threshold of all the turbines have increased to 35 m/s. If any of the turbines still have their blade load moment exceeding the blade load moment threshold, all the turbines are shut down to prevent extreme loading on the turbine components.

Similarly, at any time when normal wind condition is detected, the power setpoint of all the wind turbines is reset to its original power setpoint. For example when normal wind condition is detected, the power setpoint of the turbines 301, 302, 303, 313, 321, 322, 323 are reset back to 100% rated power production and the power production is restored back to 100% accordingly. The cut-out wind speed threshold of the turbines 301, 302, 303, 313, 321, 322, 323 is also reset back to its original threshold value, i.e. 25 m/s.

It can be seen from this example that during high wind condition with wind speed between 25 m/s to 35 m/s, the turbines are still operating albeit at a de-rated manner. Therefore the method according to the embodiment reduces overall loss of power production during high wind condition.

A third example (example 3) of operating the wind farm during high wind condition will now be described with reference to FIG. 4. In this example, not all the wind turbines have the same cut-out wind speed threshold. Specifically, the cut-out wind speed threshold is assigned to the wind turbines 301, 302, 303, 311, 312, 313, 321, 322, 323 based on their location in the wind farm 300 and the wind direction.

In FIG. 4, the wind direction is shown by the arrows 350. Based on the detected wind direction, wind turbines which are nearer or upstream of the wind are assigned lower cut-out wind speed threshold than wind turbines which are further away or downstream of the wind. In this example, wind turbine 301 is assigned a cut-out wind speed threshold of 25 m/s. Wind turbines 302, 311, 312 are assigned a cut-out wind speed threshold of 26 m/s, wind turbines 303, 313, 321, 322 are assigned a cut-out wind speed threshold of 27 m/s and wind turbine 323 is assigned a cut-out wind speed threshold of 28 m/s.

The controller 330 then detects whether any of the wind turbines 301, 302, 303, 311, 312, 313, 321, 322, 323 are shut down due to high wind. If wind turbine 301 is shut down, the controller de-rates the other wind turbines 302, 303, 311, 312, 313, 321, 322, 323 to 90% of their rated power production. There is no need to increase the cut-out wind speed threshold of the other wind turbines 302, 303, 311, 312, 313, 321, 322, 323 as they have already been assigned a higher cut-out wind speed threshold previously.

If wind turbines 302, 311 shut down, the other wind turbines 303, 312, 313, 321, 322, 323 are de-rated further to 80% of their rated power production. The cut-out wind speed threshold of the wind turbine 312 is increased to 27 m/s. If wind turbine 303 shuts down due to high wind condition, the wind turbines 312, 313, 321, 322, 323 are de-rated to 70% of their rated power production. The cut-out wind speed threshold of the wind turbines 312, 313, 321, 322 is increased to 28 m/s. If wind turbine 312 shuts down, the remaining other wind turbines 313, 321, 322, 323 are de-rated to 60% and the cut-out wind speed threshold is increased to 30 m/s. The process then continues until the cut-out wind speed threshold of the remaining wind turbines is increased to 35 m/s (i.e. maximum cut-out wind speed threshold). If the wind speed increases above 35 m/s, all the remaining turbines are shut down. Similarly if normal wind condition is detected, all the remaining operating wind turbines are reset to their original power setpoint and cut-out wind speed threshold.

It should be noted that the values of the power setpoints and cut-out wind speed thresholds used in the examples described above are only examples and the embodiments of the invention should not be restricted as such. Other power setpoints and cut-out wind speed threshold values may be used or assigned to the wind turbines in other embodiments. For example, it has been described that between wind speed 25 m/s and 35 m/s, the turbines are operated in a de-rated manner, and beyond 35 m/s, the turbines are shut down. It is also possible that the turbines are operated in a de-rated manner in a different range such as between wind speed 24 m/s and 34 m/s, where 34 m/s is the maximum wind speed threshold.

Also in the above examples, wind speed and/or blade load moment are used to detect high wind condition. It is also possible to detect high wind condition using other values such as tower acceleration in other embodiments.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A wind farm, comprising:
a plurality of wind turbines; and
a wind farm controller configured to perform operations, the operations include:
  receiving at least one signal from a first wind turbine of the plurality of wind turbines, and based on the at least one signal: detecting a wind direction at the at least one wind turbine, and detecting that the first wind turbine has shut down due to a high wind condition;
  upon detection of shut down of the first wind turbine: reducing parameter setpoints and increasing cut-out wind speed thresholds of other wind turbines of the plurality of wind turbines wherein the cut-out wind speed thresholds of the other wind turbines are increased to values at least based on the detected wind direction and respective locations of the other wind turbines relative to the first wind turbine;
  receiving at least one signal from a second wind turbine of the other wind turbines indicating the second wind turbine has shut down due to a high wind condition, wherein the second wind turbine operates using the reduced parameter setpoint and increased wind speed threshold; and
  upon detection of shut down of the second wind turbine: further reducing the parameter setpoints and further increasing the cut-out wind speed thresholds of the other wind turbines that are still operating.

2. The wind farm of claim 1, wherein the wind farm controller is configured to repeat the operations until one of the values of the cut-out wind speed thresholds of the other wind turbines has reached a maximum cut-out wind speed threshold.

3. The wind farm of claim 1, wherein the wind farm controller is configured to restore the other wind turbines to respective original parameter setpoints and respective cut-out wind speed thresholds when the wind farm controller detects a normal wind condition based on the at least one signal.

4. The wind farm of claim 3, wherein the wind farm controller is configured to start up any of the plurality of wind turbines which have been shut down due to the high wind condition.

5. The wind farm of claim 1, wherein the operations further comprise shutting down the first wind turbine based on the high wind condition, wherein the high wind condition comprises at least one of:
  a wind speed detected by the first wind turbine exceeds the respective cut-out wind speed threshold;
  a blade load moment of the first wind turbine exceeds a blade load moment threshold;
  a drive train load of the first wind turbine exceeds a drive train load threshold; and
  a tower acceleration of the first wind turbine exceeds an acceleration threshold.

6. The wind farm of claim 1, wherein the reducing the parameter setpoints comprises reducing power setpoints to reduce power productions of the other wind turbines.

7. The wind farm of claim 1, wherein the reducing the parameter setpoint comprises reducing both a power setpoint and a rotor speed setpoint to reduce both a power production and a rotational speed of a rotor of each of the other wind turbines.

8. A method of operating a wind farm comprising a plurality of wind turbines and a wind farm controller, the method comprises operations performed by the wind farm controller, the operations include:
  receiving at least one signal from a first wind turbine of the plurality of wind turbines, and based on the at least one signal: detecting a wind direction from the first wind turbine, and detecting that the first wind turbine has shut down due to a high wind condition; and
  upon detection of shut down of the first wind turbine, reducing parameter setpoints and increasing cut-out wind speed thresholds of other wind turbines of the plurality of wind turbines wherein the cut-out wind speed thresholds of the other wind turbines are increased to values at least based on the detected wind direction and respective locations of the other wind turbines relative to the first wind turbine;
  receiving at least one signal from a second wind turbine of the other wind turbines indicating the second wind turbine has shut down due to a high wind condition, wherein the second wind turbine operates using the reduced parameter setpoint and increased wind speed threshold; and
  upon detection of shut down of the second wind turbine: further reducing the parameter setpoints and further increasing the cut-out wind speed thresholds of the other wind turbines that are still operating.

9. The method of claim 8, wherein the operations further comprise repeating the operations until one of the values of the cut-out wind speed thresholds of the other wind turbines has reached a maximum cut-out wind speed threshold.

10. The method of claim 8, wherein the operations further comprise restoring the other wind turbines to respective original parameter setpoints and respective cut-out wind speed thresholds when the wind farm controller detects a normal wind condition based on the at least one signal.

11. The method of claim 10, wherein the operations further comprise starting up any of the plurality of wind turbines which have been shut down due to the high wind condition.

12. The method of claim 8, wherein the operations further comprise shutting down the first wind turbine based on the high wind condition, wherein the high wind condition comprises at least one of:
    a wind speed detected by the first wind turbine exceeds the respective cut-out wind speed threshold;
    a blade load moment of the first wind turbine exceeds a blade load moment threshold;
    a drive train load of the first wind turbine exceeds a drive train load threshold; and
    a tower acceleration of the first wind turbine exceeds an acceleration threshold.

13. The method of claim 8, wherein the reducing the parameter setpoints comprises reducing power setpoints to reduce power productions of the other wind turbines.

14. The method of claim 8, wherein the reducing the parameter setpoints comprises reducing both power setpoints and rotor speed setpoints to reduce both power productions and rotational speed of a rotor of the other wind turbines.

15. The wind farm of claim 1, wherein the wind farm controller detects that the high wind condition occurs upon detecting that any of the plurality of wind turbines have been shut down based on the at least one signal.

16. The method of claim 8, wherein the wind farm controller detects that the high wind condition occurs upon detecting that any of the plurality of wind turbines have been shut down based on the at least one signal.

17. The wind farm of claim 1, wherein the values of the cut-out wind speed thresholds for the other wind turbines are assigned based on upstream wind position, wherein one of the other wind turbines is assigned a lower value of the cut-out wind speed threshold than another of the other wind turbines further downstream.

18. The method of claim 8, wherein the values of the cut-out wind speed thresholds for the other wind turbines are assigned based on upstream wind position, wherein one of the other wind turbines is assigned a lower value of the cut-out wind speed threshold than another of the other wind turbines further downstream.

19. The wind farm of claim 1, wherein the wind farm controller is configured to reduce the parameters setpoints and increase the cut-out wind speed thresholds of the other wind turbines only after detecting the first wind turbine has shut down.

20. The wind farm of claim 19, wherein the wind farm controller is configured to further reduce the parameters setpoints and further increase the cut-out wind speed thresholds of the other wind turbines only after detecting the second wind turbine has shut down.

* * * * *